United States Patent
Yim et al.

(10) Patent No.: US 7,506,112 B2
(45) Date of Patent: Mar. 17, 2009

(54) REDUCING BITMAP MANAGEMENT OVERHEAD

(75) Inventors: Wai C. Yim, Merrimack, NH (US); Simon Crosland, Woking (GB); Philip J. Newton, Epsom (GB)

(73) Assignee: Sun Microsystems, Inc., Santa Clara, CA (US)

( * ) Notice: Subject to any disclaimer, the term of this patent is extended or adjusted under 35 U.S.C. 154(b) by 233 days.

(21) Appl. No.: 11/457,683

(22) Filed: Jul. 14, 2006

(65) Prior Publication Data

US 2008/0016295 A1    Jan. 17, 2008

(51) Int. Cl.
*G06F 12/00* (2006.01)

(52) U.S. Cl. .................. 711/156; 711/133; 711/135; 711/162

(58) Field of Classification Search .............. 711/156, 711/133, 135, 162
See application file for complete search history.

(56) References Cited

U.S. PATENT DOCUMENTS 6,175,900 B1 *  1/2001  Forin et al. ................. 711/156
6,640,290 B1 * 10/2003  Forin et al. ................. 711/156

* cited by examiner

*Primary Examiner*—Reginald G. Bragdon
*Assistant Examiner*—Mehdi Namazi
(74) *Attorney, Agent, or Firm*—Marsh Fischmann & Breyfogle LLP; Michael C. Martensen

(57) ABSTRACT

A bitmap manager creates a cached copy of a bitmap and a shadow copy of a bitmap. The contents of the shadow copy are examined as are the bitmap cache to determine when it is necessary to write bitmap data to persistent storage. Extra bits are set or left set in the bitmap shadow copy to minimize the frequency of having to write bitmap data to persistent storage.

20 Claims, 9 Drawing Sheets

REDUCING BITMAP MANAGEMENT OVERHEAD

BACKGROUND OF THE INVENTION

1. Field of the Invention

The present invention relates, in general, to bitmap management and, more particularly, to reducing bitmap management overhead by using a shadow copy of the bitmap.

2. Relevant Background

For reasons of consistency and reliability, various data services engaging in such things as remote replication, local mirroring and snapshots, issue data writes to multiple storage surfaces. The surfaces maintaining the data of these writes must typically remain identical from the user's perspective to provide desired attributes such as redundancy and dependability. In the event that an interruption occurs during these multiple writes, the state of the data on the various surfaces can not be easily determined.

A bitmap can be maintained to record the progress of writes to the multiple surfaces. During the recovery from an interruption, the contents of the bitmap can be examined to determine which regions of data can be potentially different among the various surfaces on which data was written, and therefore need to be repaired. The bitmap must reflect all data that may differ among the multiple surfaces, therefore a noted limitation is that the bitmap must be updated before multiple writes can be issued.

A bitmap is a set of bits that can be used to efficiently process queries on a body of data associated with the bitmap. In this context, a bitmap is a series of bits that indicate which of the records stored in the body of data satisfy a particular criterion. Each region in the body of data has a corresponding bit in the bitmap. Each bit in the bitmap serves as a flag to indicate whether the region that corresponds to the bit satisfies the criteria associated with the bitmap. Essentially a bitmap is data about data.

Before a data write can proceed, the bits in the bitmap that correspond to the regions being written must be set to indicate that those regions may differ among the multiple surfaces. After the writes to all the multiple surfaces have completed, the corresponding bits in the bitmap can be cleared, as the data in those regions are now identical on all the surfaces. The bitmap must be stored on a persistent storage medium in order for it to be available after a system failure, so setting and clearing bits in the bitmap involves extra reads and writes. Thus the overhead associated with managing the bitmap has a direct and significant impact on the performance of data writes as well as the overall performance of the system.

A need exists, therefore, to reduce the overhead associated with managing the bitmap. The present invention addresses this and other problems.

SUMMARY OF THE INVENTION

Briefly stated, the present invention involves computer implemented methods, systems, and computer media for reducing bitmap management overhead during data writes by using a bitmap shadow copy. When it is necessary to set or clear bits in the bitmap, an in-memory bitmap cache is created for the corresponding section of the bitmap. A bitmap manager also creates a shadow copy of the bitmap in memory. The contents of the shadow copy are kept identical to the corresponding sections of the bitmap in persistent storage. The contents of the bitmap cache may differ from the contents of the shadow copy. The bitmap cache and the shadow copy contents are examined to determine when it is necessary to write bitmap data to persistent storage.

The shadow copy is a temporary copy of those sections of the persistent bitmap data which are currently in the bitmap cache. The bitmap cache contains an accurate representation of the bits that correspond to the state of the multiple surfaces. The shadow copy and the persistent copy of the bitmap may contain a superset of the bits set in the bitmap cache. That is, all bits that are set in the bitmap cache are set in the bitmap shadow and on persistent storage, while extra bits may be set in the shadow copy and on persistent storage that are not set in the bitmap cache. By allowing these extra bits to remain set or even speculatively setting extra bits in the shadow and persistent storage, subsequent writes to persistent storage for bit set of the same region can be circumvented. Having extra bits set in the bitmap in persistent storage means that when a synchronization process is invoked to restore the multiple surfaces so as to contain identical data in the event of a system failure, it will have to do extra work. Accordingly, the more extra bits that are set, the more extra work that is needed.

In another aspect of the present invention, the bitmap cache is flushed (that is, copied to the bitmap in persistent storage) in order to reduce the amount of extra work needed to synchronize the multiple surfaces in the event of a system failure. This prevents too many bits remaining set in the persistent storage. When this happens the affected sections of the bitmap cache, the shadow copy and the bitmap on persistent storage will become identical, all now accurately representing the state of the corresponding multiple data surfaces. The bitmap cache, either in its entirety or section by section, can be flushed frequently or infrequently according to one embodiment of the present invention, in order to balance the performance benefit gained by having extra bits set in the bitmap on persistent storage against the extra work required to synchronize the data following a system failure. In another embodiment of the present invention, an examination is made to determine whether any section of the bitmap has been inactive for a period of time greater than a preset level. When a section is found that has been inactive for a period of time in excess of the prescribed limit, that section of the bitmap cache is flushed.

Also, the entire time that each section of the bitmap cache has existed is examined. When it is found that a section of the bitmap cache has been in existence for a period longer than a preset time period, that section of the bitmap cache is flushed. In another embodiment, the bitmap cache and the shadow copy are examined section by section to determine what percentage of bits are set. When the percentage of bits set in the shadow copy exceeds the percentage of bits set in the bitmap cache by a preset value, that section of the bitmap cache is flushed. Typically the time periods are such that determination of each section being inactive is less than the determination of the amount time that the section of bitmap cache has existed.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
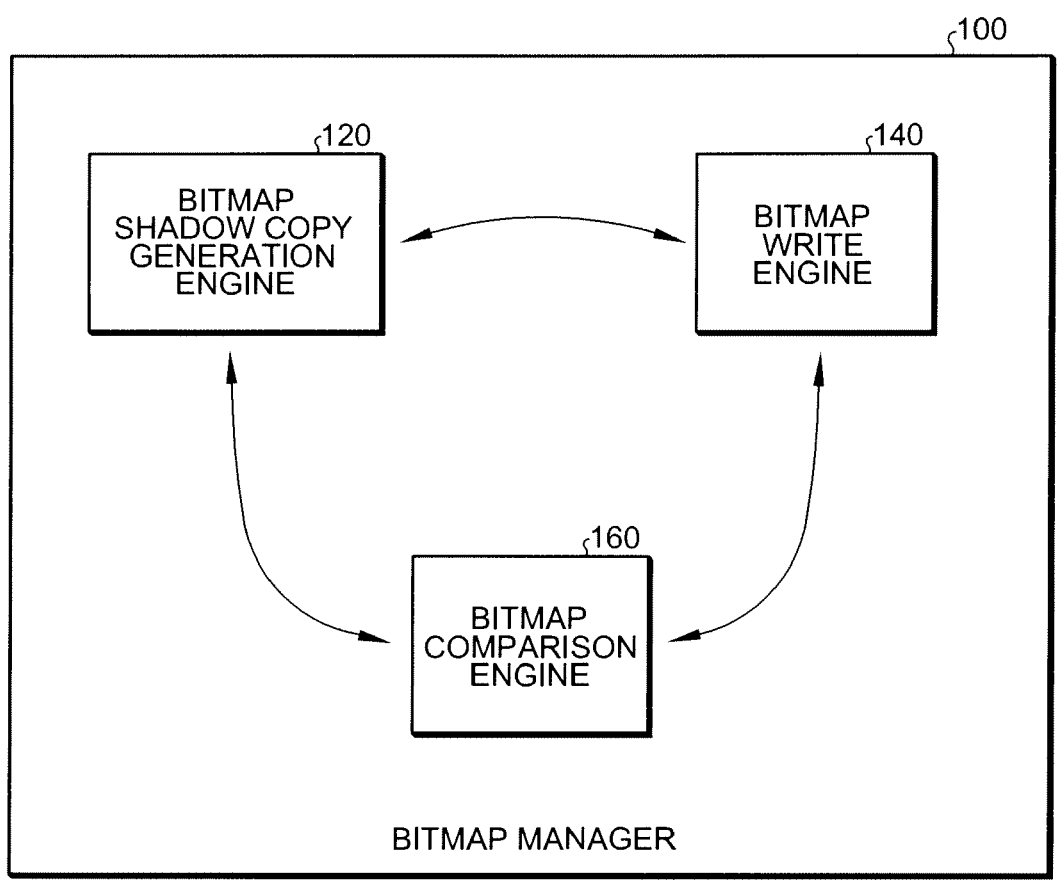
FIG. 1 shows a high level block diagram of a Bitmap manager according to one embodiment of the present invention.

The present invention is illustrated and described in terms of the aforementioned Figures. FIG. 1 illustrates a high level block diagram of a system for reducing bitmap management overhead during data writes to multiple surfaces. A bitmap manager 100 monitors the setting and clearing of bits in the bitmap setting to determine if the bitmap on persistent storage needs to be written. The bitmap manager 100 compares the bitmap cache to the shadow copy to determine if the bit is already set in the bitmap on persistent storage. When the bit is set in the shadow copy, the write to persistent storage is prevented, thus reducing write overhead.

It is to be understood that although the bitmap manager 100 is illustrated as a single entity, as the term is used herein a bitmap manager 100 refers to a collection of functionalities which can be implemented as software, hardware, firmware, or any combination of these. Where the bitmap manager 100 is implemented as software, it can be implemented as a standalone program, but can also be implemented in other ways, for example, as part of a larger program, as a plurality of separate programs, as one or more device drivers or as one or more statically or dynamically linked libraries. A bitmap manager 100 can be instantiated on and/or as part of a server, client, firewall, proxy, gateway, switch and/or any combination of these and/or other computing devices and/or platforms.

As illustrated in FIG. 1, the bitmap manager 100, according to one embodiment of the present invention, is comprised of three components, a bitmap shadow copy generation engine 120, a bitmap write engine 140, and a bitmap comparison engine 160. Each of these engines interacts with one another to manage the contents of each section of the bitmap. Bits in the bitmap are set prior to a write of data on two or more surfaces. Multiple copies of data are created for a variety of reasons.

Reliability, security, safety, efficiency, or the lack thereof, etc. are just a few of the many reasons why duplicate copies of data are created. It is often the case that the multiple writes do not occur at the same time. For example, one copy may be maintained on a local disk while the other copies may be distributed amongst several remote locations. Writes of data to multiple surfaces may fail to start, may be interrupted or may be unsuccessful. The result of such an occurrence is two or more surfaces with different data. It is the purpose of the bitmap to indicate where these difference may have occurred.

In situations where there is such a difference a bitmap indicates which regions of the multiple surfaces need to be repaired. In that manner, the entire surface need not be copied, only those regions indicated by bits which are set in the bitmap. A bitmap therefore represents the state of a storage medium volume. Before a region of a surface is modified by a data write, the bit in the bitmap corresponding to that region is set. Once the write is completed and verified, the bit can be cleared. Thus the state of each region of the data can be ascertained should an interruption occur.

Referring now back to FIG. 1 and according to one embodiment of the present invention, the bitmap shadow copy generation engine 120 maintains a shadow copy of the bitmap in memory. The bitmap write engine 140 thereafter controls writes to the bitmap existing in both persistent storage and in cache. The bitmap comparison engine 160 monitors the bitmap process to determine whether any of the bits being written to the bitmap have been previously set.

After a bit has been set or cleared, the corresponding section of the bitmap which is kept in the cache is preserved for a period of time according to various criteria. Thereafter, as new regions are identified by a data write, the bitmap comparison engine 160 determines whether the bit representing the data to be written to is already set in the bitmap on persistent storage. If the same region is identified, the setting of the bit in the bitmap on persistent storage and the shadow copy can be eliminated since the shadow copy indicates that the bit is already set. Therefore, many of the previous bitmap writes are prevented without jeopardizing the safety and integrity of the data.

Before a data write to a new region occurs, it is necessary to set the corresponding bits in the bitmap. This process will incur the overhead of writing to persistent storage. After the data writes to the multiple storage surfaces have all completed, the corresponding bits in the bitmap cache are cleared to accurately reflect the new state of the surfaces. However, it is not necessary to clear the bits in the bitmap on persistent storage, thus saving the bitmap write overhead. In this way, a subsequent write to the same region will also not incur a bitmap write as the corresponding bits are still set in the bitmap on persistent storage and in the shadow copy, thus saving another bitmap write.

Figure 2:
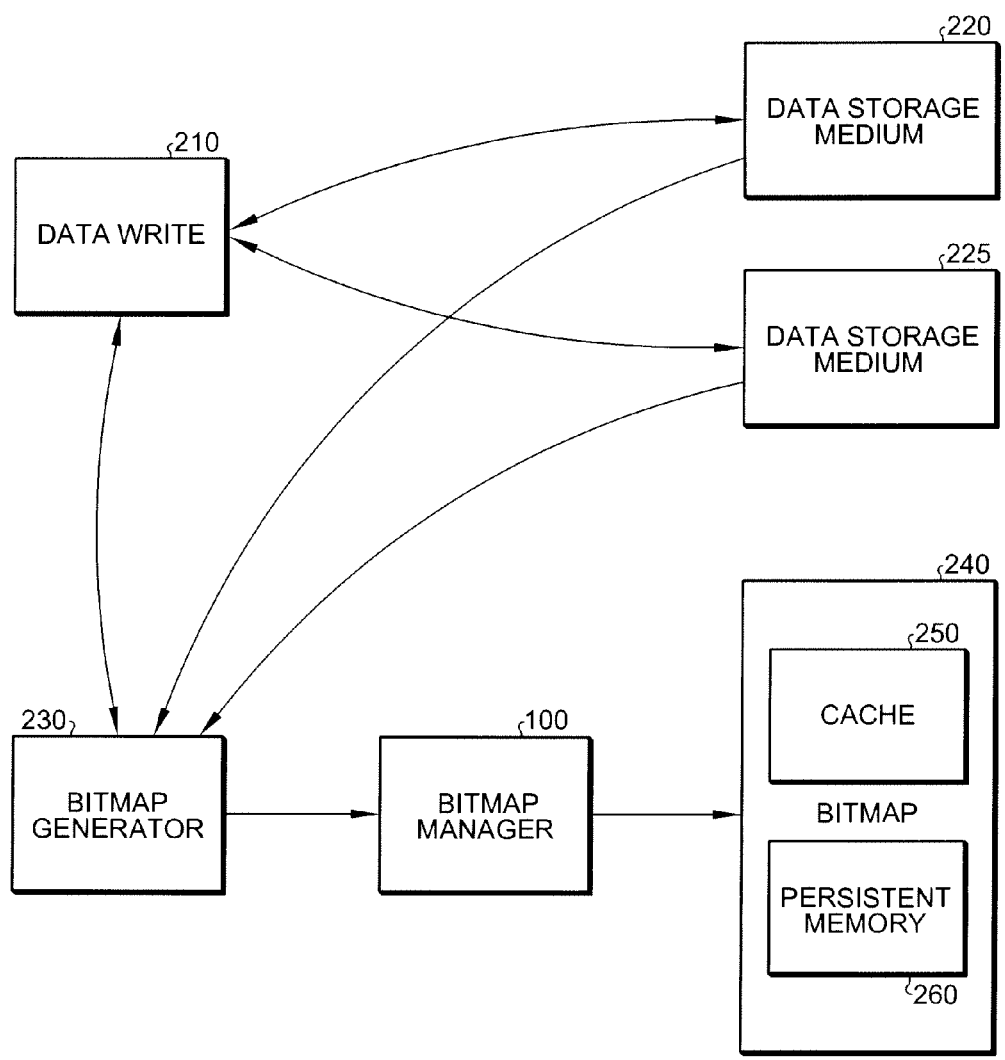
FIG. 2 shows a high level block diagram of the relationship between a data write and updating of the bitmap according to one embodiment of the present invention.

FIG. 2 shows a high level block diagram of the relationship between a data write and the management of the bitmap according to one embodiment of the present invention and can be used to better understand the present invention. A data write 210 is issued to create two or more copies of the data in separate data storage mediums 220, 225. Prior to the write beginning, a bitmap generator 230 updates the bitmap 240. The bitmap generator also notifies the bitmap manager 100 of the impending write. The bitmap manager 100 creates a shadow copy of the bitmap 260.

A write of data is directed to a logical block address range. For example, a particular data write 210 may designate writing to logical block addresses 1020 to 1040 for a 20 block data write.

Subsequent to the initial data write 210 command to blocks 1020 to 1040, more data may be written to blocks 1020 to 1040. The prior art would cause the bitmap to be updated each time a write of data occurred to this range of logical block addresses. The present invention maintains the bitmap cache in memory until it meets certain predetermined criteria. Therefore, once a write has been commenced to blocks 1020 to 1040, the corresponding bits have been set in the bitmap. Upon further data being written to those blocks, the bitmap manager 100 identifies that the bits for those blocks have already been written to the bitmap on persistent storage. The bitmap manager 100 bypasses the setting of the bits since the bits designating these particular logical blocks have already been set.

Figure 3:
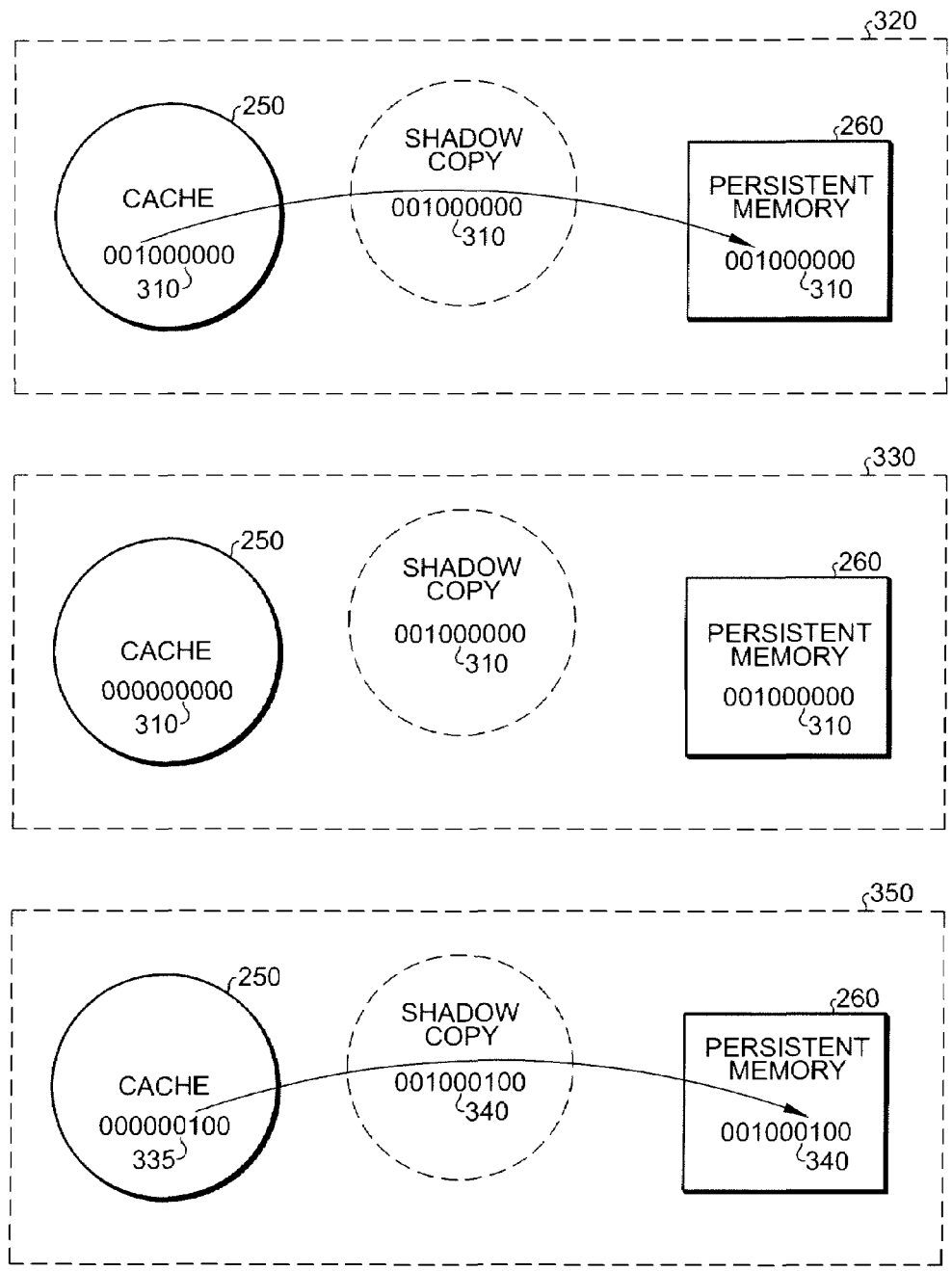
FIG. 3 shows a three step example of the setting and clearing of bits in the bitmap cache, and the resulting contents of the bitmap in persistent storage according to one embodiment of the present invention.

FIG. 3 shows a three step example of the updating of a bitmap in persistent storage according to one embodiment of the present invention. FIG. 3 shows a number of bits stored in cache 250 and in persistent storage 260 according to the present invention. As shown in the first frame 320 of FIG. 3, a shadow copy 310 is created by the bitmap manager 100 once a bitmap has been set by the bitmap generator 230. The bit is set in cache and then written to the persistent storage 260. Upon completion of the data write, according to one embodiment of the present invention and as shown in the second frame 330 of FIG. 3, the bit is cleared in the bitmap cache but not in the bitmap in persistent storage. In another embodiment of the present invention, the cache copy of the bitmap is maintained for a preset period of time or until the cache is needed for other operations.

The shadow copy 310 of the bitmap stored in persistent storage 260 remains intact. The next data write generates another bit 335 to be set in the bitmap as depicted in frame three 350 indicating that another range of logical block addresses is about to be written. The shadow copy 340 is updated with the new bit that is again stored in persistent storage. Underlying this process, the bitmap manager 100 is comparing the change in the bitmap cache with the shadow copy to determine whether a new write to the bitmap maintained in persistent storage 260 is necessary.

Figure 4:
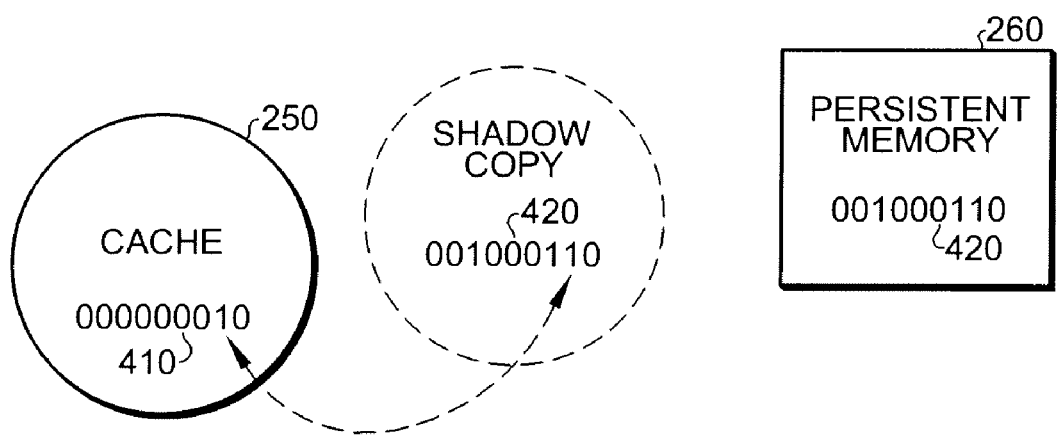
FIG. 4 shows an example of a bitmap comparison where a write to the bitmap in persistent storage is circumvented because the shadow copy indicates that the bit is already set in persistent storage according to one embodiment of the present invention.

FIG. 4 shows a bitmap comparison process for reducing bitmap management overhead according to one embodiment of the present invention. In the scenario shown in FIG. 4, a data write 210 has identified a write to a range of logical block addresses represented as 000000100. The bitmap manager 100 compares the newly identified bit 410 to the shadow copy 420 associated with this particular data write 210. The stored bitmap, 0010000100, already possesses the bit 000000100. In such a scenario, the bitmap manager 100 eliminates the need to newly identify the pending range of logical block addresses since those blocks have already been associated with the data write 210.

Figure 5A:
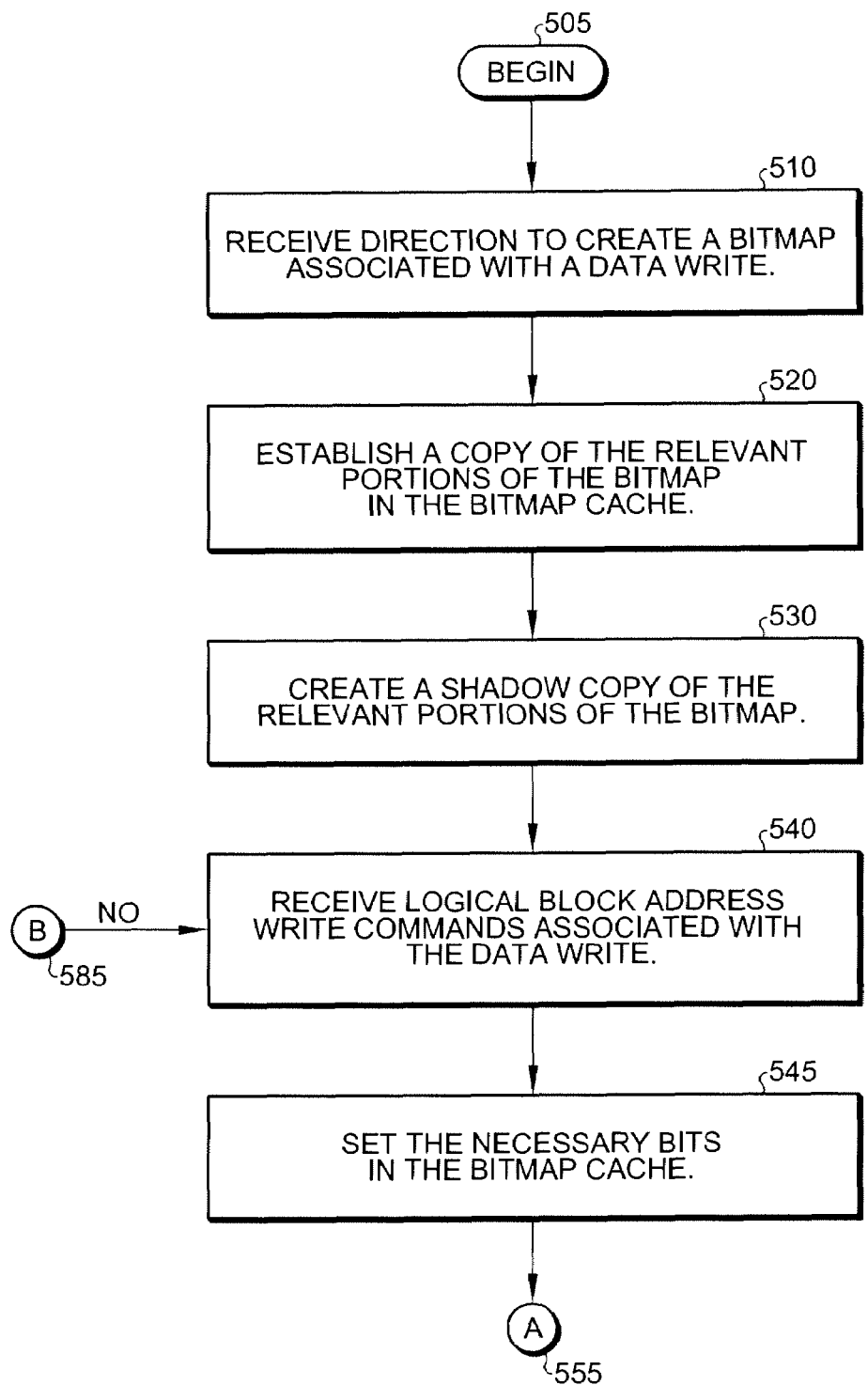
FIGS. 5A and 5B show a flow diagram of one method embodiment according to the present invention for reducing bitmap management overhead.
Figure 5B:
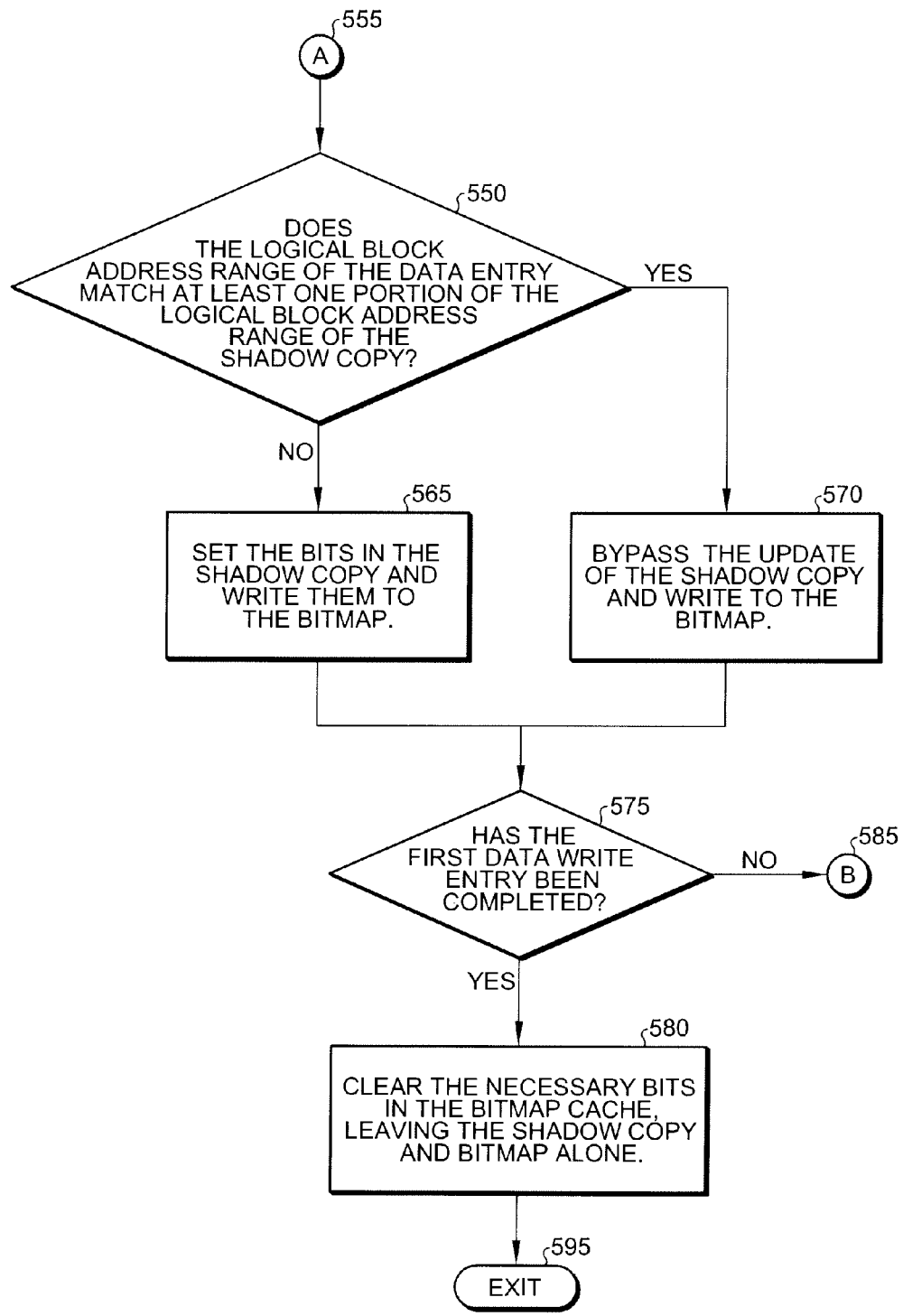

The steps of managing updates to the bitmap, according to embodiment of the present invention, are further shown as a flow chart depicted in FIGS. 5A and 5B. The process of managing a bitmap begins at 505 with the reception of a command to update the bitmap associated with a data write 510. Upon receiving such a command, the bitmap generator 230 establishes a bitmap cache 520 and, according to one embodiment of the present invention, the bitmap manager 100 creates 530 a shadow copy of the bitmap in memory. As data write commands are issued 545, the bitmap manager 100 updates 550 the bitmap cache and, if necessary, the shadow copy in memory and the bitmap on persistent storage.

In one embodiment of the present invention, after a write has been completed to the cache, a query is presented comparing 550 the logical block addresses of the data write with the each section of the logical block addresses already present in the shadow copy of the bitmap. When the comparison finds that a bit for the logical block address range of the data write has already been set in the shadow copy, the setting of that bit by an additional write to the bitmap on persistent storage is bypassed 570. When the comparison finds that the bit for the range of logical block addresses associate with data write has not been set, the bitmap manager 100 directs a write 565 to the bitmap on persistent storage setting the appropriate bit.

After the comparison of the shadow copy of the bitmap and the pending data write has been completed, a second query is made determining whether the data write has been completed 575. When the answer is yes and the data write is complete, in one embodiment of the present invention, the bit is cleared in the bitmap cache 580 and the process ends 595. When the data write is still ongoing and the query produces a negative answer, the bitmap manager 100 looks for the reception of additional logical block address write commands associated with the pending data write 540.

In another embodiment of the present invention, the bitmap manager 100 speculatively sets bits in the bitmap on persistent storage prior to receiving a data write for those particular ranges of logical block addresses. When a data write is encountered, the bits associated with several blocks surrounding the bit containing data are also set. In one embodiment of the present invention, all bits in a byte are set. In the event of a sequential write load, this will have the effect of avoiding bitmap updates for subsequent data writes. In the case of a system crash and recovery, there is the penalty to be paid regarding set bits that are in fact speculative and not actually used, however the performance benefit to adding the bits using a single write command rather than multiple commands is significant.

For example, if a sequential write command is issued identifying the following bit 00100000000, the bitmap manager 100 may set bits 00111111111 in the bitmap cache. The subsequent writes to the bitmap for 00010000000, 00001000000, 00000100000, etc. can be eliminated significantly reducing bitmap management overhead.

In yet another embodiment of the present invention, multiple updates to the same section of the bitmap are coalesced prior to the actual writing. In this embodiment the bitmap manager 100 avoids queuing and serializing coincident writes to the bitmap. Clearly this reduces the number of writes to the bitmap 260. The trade off is that the first write can incur a slight latency penalty due to the processing of additional writes being coalesced. Subsequent writes benefits greatly due to the removal of serialization of the bitmap write. A limit to the coalescing is, in another embodiment, placed on the bitmap manager 100 so as to eliminate the risk of coalescing indefinitely.

Another aspect of the present invention is the lazy clearing of the bitmap. The bitmap maintains bits corresponding to the logical block addresses of the data write 210 that is being undertaken. A particular range of block addresses may be written to several times, and the bitmap manager 100 manages these so as to prevent the bitmap from being updated upon the completion of each write. The bitmap cache is cleared, but not the bitmap in persistent storage. In this way, subsequent bit sets will not incur the overhead of wiring to persistent storage, as the bits will already be set.

A means to flush the contents of the bitmap cache is run periodically, as will be subsequently described, to flush inactive sections of the bitmap cache. Additionally, when the system is shutdown the bitmap cache will be flushed so that when the system is restarted the bitmap in persistent storage will accurately reflect the state of the data.

Each of these previous embodiments share a similar trade off in that at any given moment, bits are set in the bitmap stored in persistent storage 260 that have been cleared in the bitmap cache. The bits do not represent any potential for data corruption yet if left uncorrected in the event of a crash of the processor; they each represent data that would be replicated needlessly in an ensuing update or recovery. In one embodiment of the present invention, to mitigate these and other scenarios, the bitmap cache is flushed at periodic time intervals and according to other specific criteria.

In a further embodiment of the present invention, the bitmap cache is flushed periodically. In other embodiments, the bitmap cache is maintained as long as possible pending other higher priority uses of the cache. Should the bitmap cache remain unchanged beyond a present period of time, the cache is thereafter cleared or flushed.

Figure 6:
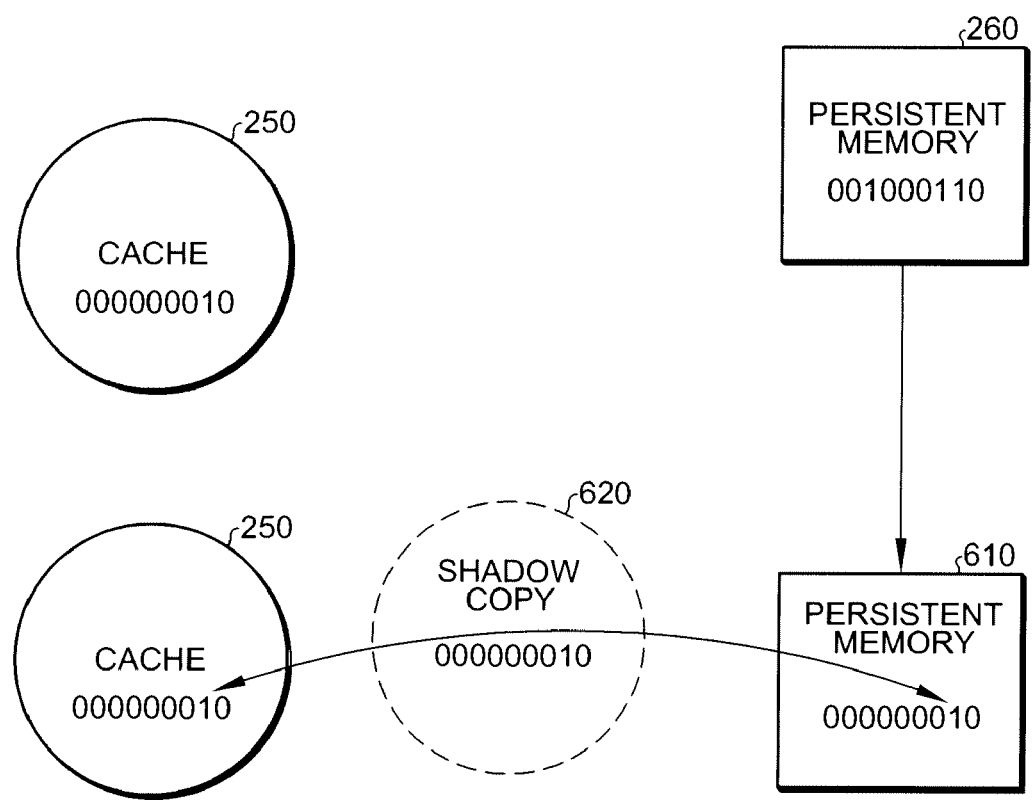
FIG. 6 is an example of flushing the bitmap cache to the bitmap stored in persistent storage according to one embodiment of the present invention.

FIG. 6 is a graphical rendition of flushing the bitmap cache according to one embodiment of the present invention. Shown in FIG. 6 is a section of the bitmap cache 250 that initially differs from the bitmap in persistent storage 260. For one or more reasons, the bitmap manager 100 directs the bitmap cache to be flushed. This is accomplished by updating the bitmap with those bits currently present in the bitmap cache. The result is a shadow copy and bitmap 610 reflecting the current bitmap cache.

Figure 7:
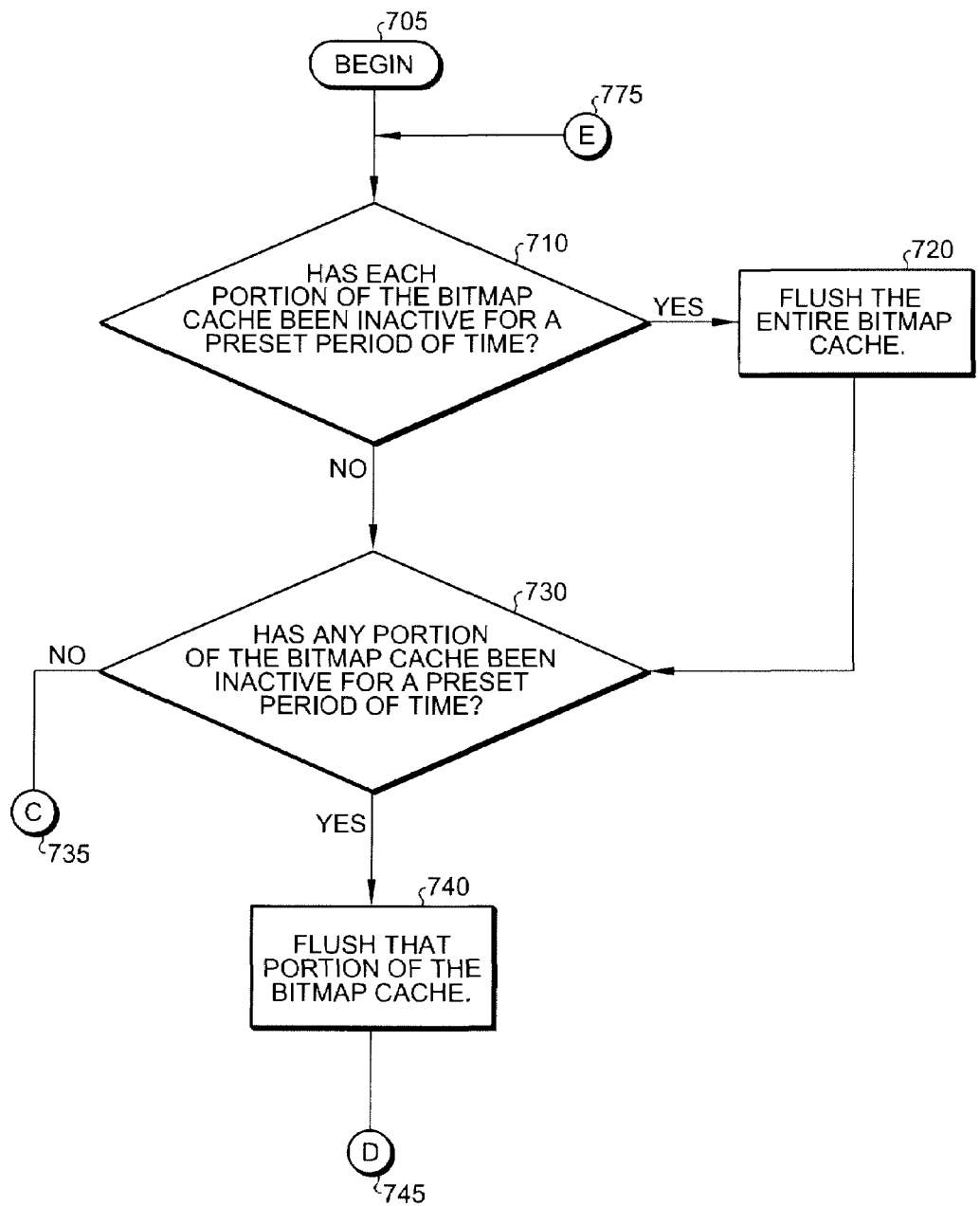
FIGS. 7A and 7B show one embodiment of a flow diagram for flushing the bitmap cache according to one or more pre-established criteria according to the present invention.
Figure 7B:
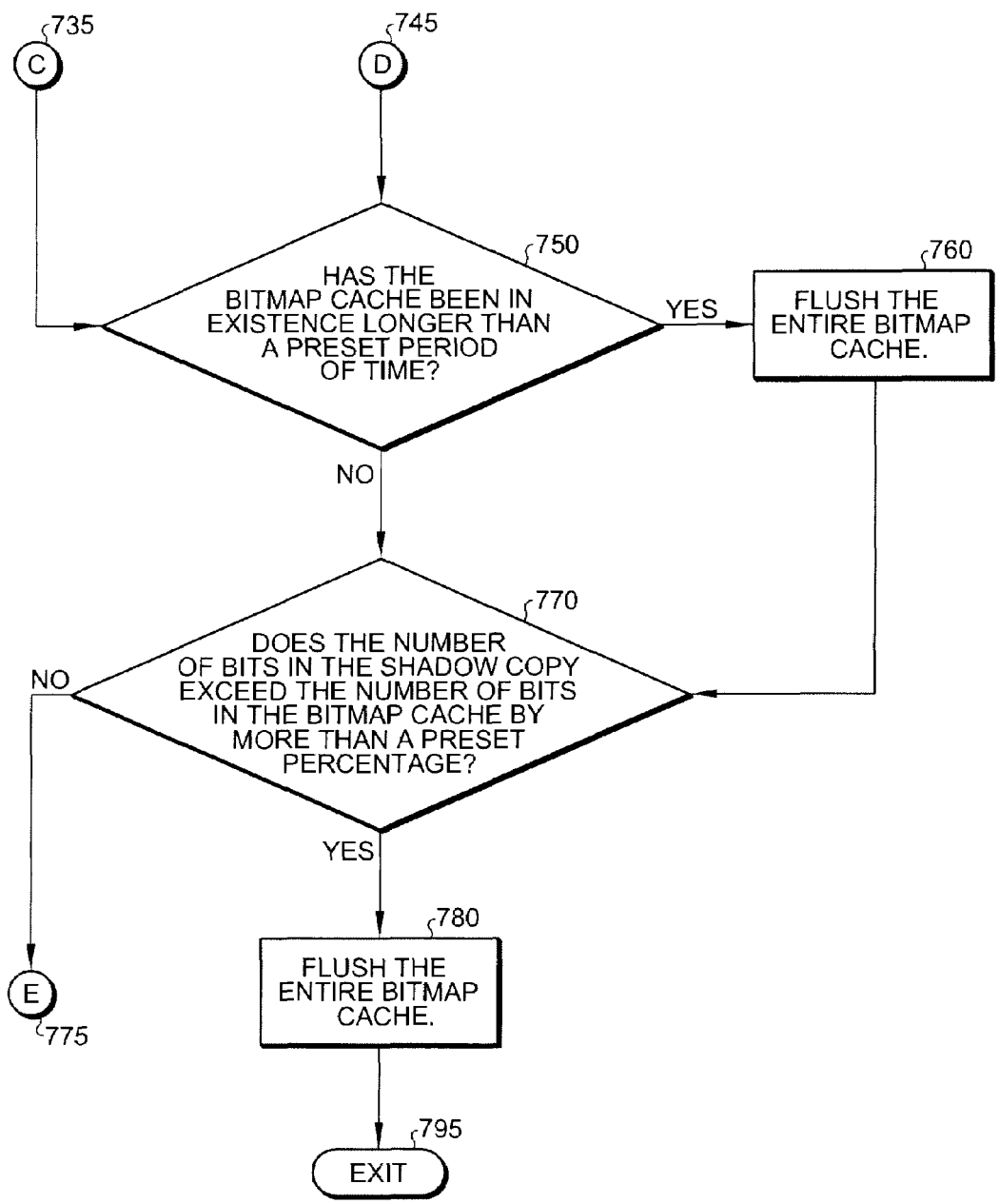

FIGS. 7A and 7B shows one embodiment of a flow diagram for flushing the bitmap cache according to one or more pre-established criteria according to the present invention. As previously described, it is desirable to periodically flush the bitmap. The flow diagram shown in FIG. 7 represents one embodiment of a series of steps resulting in the flushing of the bitmap cache. As will be apparent to one skilled in the relevant art, the flushing of the bitmap cache can be based on various criteria without departing from the spirit and scope of the present invention.

As shown in FIG. 7A a query is conducted with respect to the entire bitmap cache. Each section of the bitmap maintained in cache is examined to determine whether it has been inactive 710 for a first preset period of time. In one embodiment of the present invention, the preset period of time is based on computing activity or other computing related criteria. In other embodiments, the preset period of time can be arbitrarily set. When all sections of the bitmap cache are found to have been inactive for a period of time exceeding a preset value, the entire bitmap maintained in the cache is flushed 720.

After examining whether each individual section of the bitmap cache has exceeded a first preset criteria, each section of the bitmap cache is examined to determine if any has exceeded a second preset criteria. A scenario may exist wherein many of the sections in a bitmap remain inactive, yet one or two sections keep the entire bitmap cache from being flushed. Therefore, a second query 730 is made to determine whether any section of the bitmap cache has been in existence for a second preset period of time. In this embodiment, the second preset period of time is constrained to be for a longer period of time than the first. Those sections of the bitmap cache that have been inactive for a period of time greater than the second preset period of time are then flushed 740 by the bitmap manager 100.

A final query is then asked with respect to the age and quality of the bitmap cache in general. While each section in the bitmap cache may demonstrate activity such that it is not designated for flushing, the overall quality of the bitmap cache over time may deteriorate. Therefore, a query is made to examine the age and quality of the bitmap cache. First, in one embodiment, the age of the bitmap cache is determined 750. If the bitmap cache is older than a preset period of time, despite the activity of individual sections within the bitmap cache, the entire bitmap cache is flushed 760. Second, the percentage of the bitmap cache that is set is compared to the percentage of the shadow copy that is set 770. When the shadow bitmap's percentage of bits set exceeds the bitmap cache's percentage of bits set by a preset level, the bitmap cache is flushed 780.

Typically, and in one embodiment of the present invention, the preset time periods described above are not equal. In one embodiment of the present invention, the time period for the determination whether all sections of the bitmap cache have been inactive is less than the period of time for determination of whether any section of the bitmap cache has been inactive. Similarly, the time period to determine whether the bitmap cache has been in existence beyond a certain period of time is greater than the time period for examining any section of the bitmap cache.

The result of the flushing is to update the bitmap with bits representing the current state of the data.

These and other implementation methodologies for reducing bitmap management overhead during a data write can be successfully utilized by the bitmap manager 100. These implementation methodologies are known within the art and the specifics of their application within the context of the present invention will be readily apparent to one of ordinary skill in the relevant art in light of this specification.

As will be understood by those familiar with the art, the invention may be embodied in other specific forms without departing from the spirit or essential characteristics thereof Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer implemented method for reducing bitmap management overhead during a data write, the method comprising:

establishing a bitmap cache, wherein the bitmap cache is a copy of a bitmap in a cache;

creating a shadow copy of the bitmap;

writing a first bit associated with a first data write entry into the bitmap cache, a bitmap on persistent storage, and the shadow copy, wherein the first bit is associated with a first range of logical block addresses;

receiving a second data write entry;

comparing each logical block address of the second data write entry to each logical block address associated with bits in the shadow copy of the bitmap;

responsive to at least one section of a logical block address range of the second data write entry matching at least one section of a logical block address range associated with bits in the bitmap, bypassing writing a second bit associated with a second range of logical block addresses to the bitmap on persistent storage; and responsive to at least one section of the logical block address range of the second data write entry being unique to each section of the logical block address range associated with bits in the bitmap, writing a second bit associated with the second range of logical block addresses of the second data write entry to the bitmap cache, the bitmap on persistent storage and the shadow copy.

2. The computer implemented method of claim 1, further comprising flushing the bitmap cache.

3. The computer implemented method of claim 2, wherein flushing the bitmap cache is based on a preset period of time of inactivity.

4. The computer implemented method of claim 2, further comprising retaining the bitmap cache for a preset period of time, and responsive to the expiration of the preset period of time, flushing the bitmap cache.

5. The computer implemented method of claim 1, further comprising responsive to each section of the bitmap cache being inactive for a preset period of time, flushing the bitmap cache.

6. The computer implemented method of claim 1, further comprising responsive to any section of the bitmap cache being inactive for a preset period of time, flushing the bitmap cache.

7. The computer implemented method of claim 1, wherein each data write entry is a coalescence of writes queued to a unique section of the bitmap.

8. The computer implemented method of claim 1, further comprising responsive to completion of the first data write entry, clearing the bitmap in the cache.

9. The computer implemented method of claim 1, further comprising:

creating speculative bits in the bitmap for all bits within a byte; and flushing the speculative bits in the bitmap responsive to a preset period of time of inactivity.

10. The computer implemented method of claim 1, further comprising:

responsive to each section of the bitmap in the cache being inactive for a first preset period of time, flushing the entire bitmap from the cache;

responsive to any section of the bitmap in the cache being inactive for a second preset period of time, flushing that section of the bitmap from the cache; and responsive to the bitmap existing for a period of time greater than a third preset period of time and the bitmap having more than a preset percentage of extra bits set than the bitmap cache, flushing the bitmap from the cache, wherein the first preset period of time is less than the second preset period of time, and the second preset period of time is less than the third preset period of time.

11. At least one computer-readable medium containing a computer program product for reducing bitmap management overhead during a data write, the computer program product comprising:

program code for establishing a bitmap cache, wherein the bitmap cache is a copy of a bitmap in a cache;

program code for creating a shadow copy of the bitmap;

program code for writing a first bit associated with a first data write entry into both the bitmap and the shadow copy, the first bit being associated with a first range of logical block addresses;

program code responsive to completion of the first data write entry, for clearing the bitmap in the cache;

program code for receiving a second data write entry;

program code of writing a second bit associated with the second data write into the bitmap in the cache, the second bit being associated with a second range of logical block addresses;

program code for comparing each logical block address of the second data write entry to each logical block address associated with bits of the shadow copy of the bitmap;

program code responsive to at least one section of a logic block address range of the second data write entry matching at least one section of a logical block address range associated with bits in the bitmap, bypassing writing the second bit associated with a second range of logical block addresses to the shadow copy of the bitmap and to a bitmap on persistent storage; and program code responsive to at least one section of the logical block address range of the second data write entry being unique to each section of the logical block addresses associated with bits in the shadow copy, writing the second bit associated with the second range of logical block addresses of the second data write entry to the shadow copy of the bitmap and to the bitmap in persistent storage.

12. The at least one computer-readable medium containing a program product of claim 11, further comprising program code for flushing the bitmap cache.

13. The at least one computer-readable medium containing a program product of claim 12, wherein flushing the bitmap cache is based on a preset period of time of inactivity.

14. The at least one computer-readable medium containing a program product of claim 11, further comprising program code responsive to each section of the bitmap cache being inactive for a preset period of time, flushing the bitmap cache.

15. The at least one computer-readable medium containing a program product of claim 11, further comprising program code responsive to any section of the bitmap being inactive for a preset period of time, flushing the bitmap cache.

16. The at least one computer-readable medium containing a program product of claim 11, wherein each data write entry is a coalescence of writes queued to a unique section of the bitmap.

17. The at least one computer-readable medium containing a program product of claim 11, further comprising;

program code for setting speculative bits in the bitmap for all bits within a byte; and program code for flushing the bitmap cache responsive to a preset period of time of inactivity.

18. The at least one computer-readable medium containing a program product of claim 11, further comprising:

program code responsive to each section of the bitmap in the cache being inactive for a first preset period of time, flushing the bitmap from the cache;

program code responsive to any section of the bitmap in the cache being inactive for a second preset period of time, flushing that section of the bitmap from the cache; and program code responsive to the bitmap in the cache existing for a period of time greater than a third preset period of time and a percentage of bits set in the bitmap on persistent storage exceeding the percentage of bits set in the bitmap cache by more than a preset value, flushing the bitmap from the cache, wherein the first preset period of time is less than the second preset period of time, and the second preset period of time is less than the third preset period of time.

19. A computer system for reducing bitmap management overhead during a data write, the computer system comprising:

a machine capable of executing instructions embodied as software;

a plurality of software portions, wherein one of said software portions is configured to establish a bitmap cache, wherein the bitmap cache is a copy of a bitmap in a cache, wherein one of said software portions is configured to create a shadow copy of the bitmap, wherein one of said software portions is configured to write a first bit associated with a first data write entry into both the bitmap and the shadow copy, the shadow copy having a first range of logical block addresses, wherein one of said software portions is configured to receive a second data write entry, wherein one of said software portions is configured to compare each logical block address of the second data write entry to each logical block address associated with bits in the bitmap, wherein one of said software portions is configured to, responsive to at least one section of a logic block address range of the second data write entry matching at least one section of a logical block address range associated with bits in the bitmap, bypass writing a second bit associated with a second range of logical block addresses to the bitmap, and wherein one of said software portions is configured to, responsive to at least one section of the logical block address range of the second data write entry being unique to each section of the logical block address range associated with bits in the bitmap, write the second bit associated with the second range of logical block addresses of the second data write entry to the bitmap in the cache, the shadow copy, and a bitmap on persistent storage.

20. The computer system of claim 19, wherein one of said software portions is configured to, responsive to each section of the bitmap cache being inactive for a first preset period of time, flush the bitmap cache; , and wherein one of said software portions is configured to, responsive to any section of the bitmap cache being inactive for a second preset period of time, flush that section of the bitmap cache from persistent storage, wherein the first present period of time is less than the second preset period of time.

* * * * *

UNITED STATES PATENT AND TRADEMARK OFFICE
CERTIFICATE OF CORRECTION

| | | |
|---|---|---|
| PATENT NO. | : 7,506,112 B2 | Page 1 of 1 |
| APPLICATION NO. | : 11/457683 | |
| DATED | : March 17, 2009 | |
| INVENTOR(S) | : Yim et al. | |

It is certified that error appears in the above-identified patent and that said Letters Patent is hereby corrected as shown below:

Column 9, line 16, delete "a" and insert therefor --the--.

Column 10, line 23, delete "logic" and insert therefor --logical--.

Column 12, line 6, delete "logic" and insert therefor --logical--.

Signed and Sealed this

Twenty-eighth Day of April, 2009

JOHN DOLL
*Acting Director of the United States Patent and Trademark Office*